(12) United States Patent
Mann et al.

(10) Patent No.: US 9,300,695 B2
(45) Date of Patent: Mar. 29, 2016

(54) METHOD AND APPARATUS FOR MANIPULATING AVPS IN A DIAMETER ROUTING AGENT

(71) Applicant: ALCATEL LUCENT CANADA, INC., Ottawa (CA)

(72) Inventors: Robert A. Mann, Carp (CA); Mike Vihtari, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 369 days.

(21) Appl. No.: 13/892,494

(22) Filed: May 13, 2013

(65) Prior Publication Data

US 2013/0322429 A1 Dec. 5, 2013

Related U.S. Application Data

(63) Continuation-in-part of application No. 13/482,690, filed on May 29, 2012, and a continuation-in-part of application No. 13/482,587, filed on May 29, 2012, now Pat. No. 8,804,931, and a continuation-in-part of application No. 13/602,579, filed on Sep. 4, 2012, now Pat. No. 8,850,064.

(51) Int. Cl.
*H04L 29/06* (2006.01)
*H04L 29/08* (2006.01)
*H04L 12/14* (2006.01)

(52) U.S. Cl.
CPC .......... *H04L 65/1003* (2013.01); *H04L 65/104* (2013.01); *H04L 67/1036* (2013.01); *H04L 67/28* (2013.01); *H04L 67/327* (2013.01); *H04L 12/1407* (2013.01)

(58) Field of Classification Search
CPC ............................ H04L 47/726; H04L 12/911
USPC .................. 370/352, 328; 709/206, 204, 238; 707/736
See application file for complete search history.

(56) References Cited

U.S. PATENT DOCUMENTS

| | | | |
|---|---|---|---|
| 2007/0255738 A1* | 11/2007 | D'Costa | 707/101 |
| 2011/0022722 A1* | 1/2011 | Castellanos Zamora et al. | 709/235 |
| 2011/0208853 A1* | 8/2011 | Castro-Castro et al. | 709/223 |
| 2012/0155389 A1* | 6/2012 | McNamee et al. | 370/328 |
| 2012/0155470 A1* | 6/2012 | McNamee et al. | 370/392 |
| 2012/0259970 A1* | 10/2012 | Hu et al. | 709/224 |

* cited by examiner

*Primary Examiner* — Nicholas Taylor
*Assistant Examiner* — Sanjoy Roy
(74) *Attorney, Agent, or Firm* — Kramer & Amado, P.C.

(57) ABSTRACT

Various exemplary embodiments relate to a method and related network node including one or more of the following: receiving a Diameter message at the DRA from an origin device; establishing a message context object in response to receiving the Diameter message, wherein the message context object includes a first collection of child objects; evaluating at least one rule, including: modifying, based on a first instruction, a first index value associated with the first collection of child objects, accessing, based on a second instruction and from the first collection of child objects, a child object corresponding to the first index value; and transmitting a message based on the evaluation of the at least one rule.

17 Claims, 6 Drawing Sheets

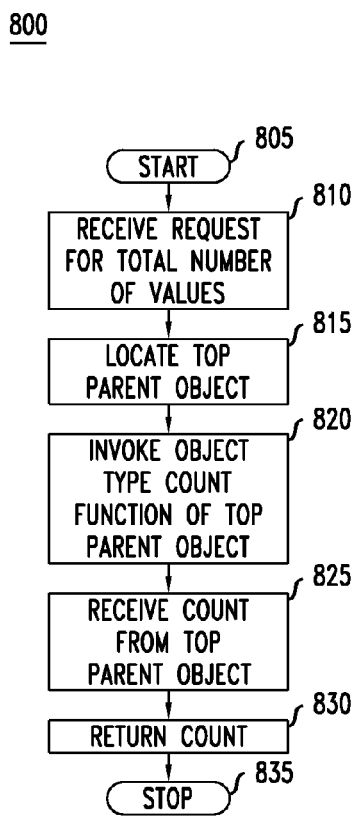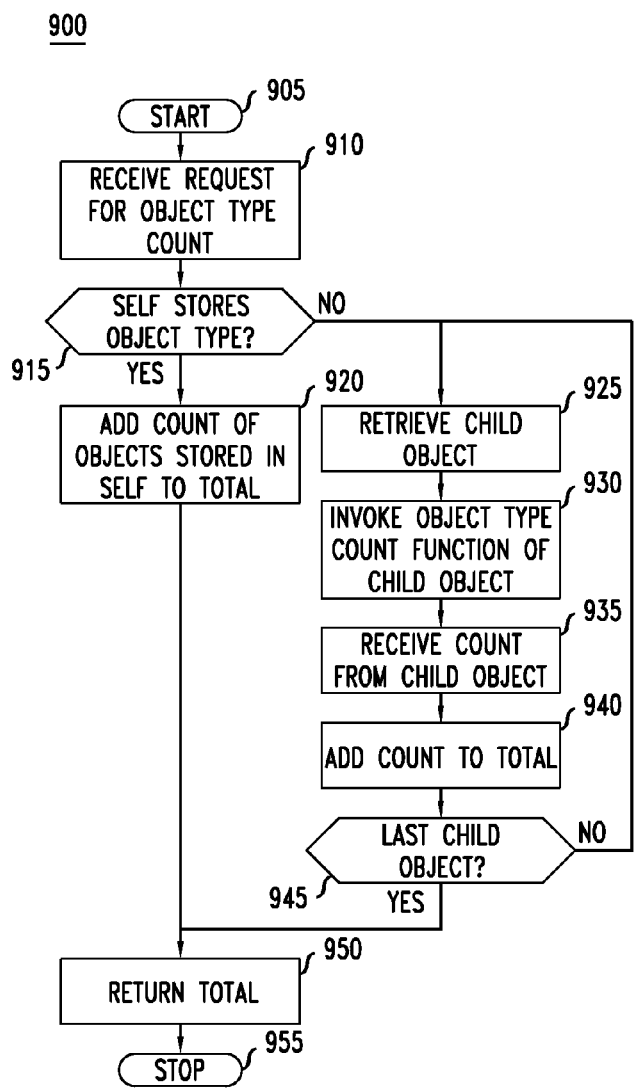
FIG. 8
FIG. 9

METHOD AND APPARATUS FOR MANIPULATING AVPS IN A DIAMETER ROUTING AGENT

CROSS-REFERENCE TO RELATED APPLICATIONS

This application is a continuation-in-part the following co-pending applications, which are hereby incorporated by reference for as purposes as if fully set forth herein: application Ser. No. 13/482,690, filed on May 29, 2012, "ORGANIZATION OF DIAMETER ROUTING AGENT RULE SETS;" application Ser. No. 13/482,587, filed on May 29, 2012, "ROUTING DECISION CONTEXT OBJECTS;" application Ser. No. 13/602,579, filed on Sep. 4, 2012, "RULE ENGINE EVALUATION OF CONTEXT OBJECTS."

TECHNICAL FIELD

Various exemplary embodiments disclosed herein relate generally to communications networking.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAB) facilitate movement of packets in a network. In various deployments, DRAs may perform elementary functions such as simple routing, proxying, and redirect.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method performed by a Diameter Routing Agent (DRA) for processing a Diameter message, the method including: receiving a Diameter message at the DRA from an origin device; establishing a message context object in response to receiving the Diameter message, wherein the message context object includes a first collection of child objects; evaluating at least one rule, including: modifying, based on a first instruction, a first index value associated with the first collection of child objects, accessing, based on a second instruction and from the first collection of child objects, a child object corresponding to the first index value; and transmitting a message based on the evaluation of the at least one rule.

Various embodiments described herein relate to a Diameter Routing Agent (DRA) for processing a Diameter message, the DRA including: a rules storage configured to store at least one rule; a Diameter stack configured to receive a Diameter message from an origin device; a context creator configured to establish a message context object in response to receiving the Diameter message, wherein the message context object includes a first collection of child objects; a rule engine configured to evaluate the at least one rule, including: modifying, based on a first instruction, a first index value associated with the first collection of child objects, accessing, based on a second instruction and from the first collection of child objects, a child object corresponding to the first index value; and a message handler configured to transmit, via the Diameter stack, a message based on the evaluation of the at least one rule.

Various embodiments described herein relate to a non-transitory machine-readable storage medium encoded with instructions for execution by a Diameter Routing Agent (DRA) for processing a Diameter message, the medium including: instructions for receiving a Diameter message at the DRA from an origin device; instructions for establishing a message context object in response to receiving the Diameter message, wherein the message context object includes a first collection of child objects; instructions for evaluating at least one rule, including: instructions for modifying, based on a first instruction, a first index value associated with the first collection of child objects, instructions for accessing, based on a second instruction and from the first collection of child objects, a child object corresponding to the first index value; and instructions for transmitting a message based on the evaluation of the at least one rule.

Various embodiments are described wherein: the first index value is a read index value; accessing the child object corresponding to the first index value includes retrieving a value from the child object; and evaluating at least one rule further includes: modifying, based on a third instruction, a write index value associated with the collection of child objects, and modifying, based on a fourth instruction, a value of another child object of the first collection of child objects, wherein the other child object corresponds to the write index value.

Various embodiments are described wherein evaluating at least one rule further includes determining, based on a third instruction, a number of elements belonging to the collection of objects.

Various embodiments are described wherein: the first collection of child objects includes a plurality of second collections of child objects; the child object is one of the plurality of second collections of child objects; and evaluating at least one rule further includes: modifying, based on a third instruction, a second index value associated with at least one of the second collections of child objects, and accessing, based on the second instruction and from the child object, a grandchild object corresponding to the second index value.

Various embodiments are described wherein evaluating at least one rule further includes determining, based on a fourth instruction, a total number of objects belonging to any of the plurality of second collections of child objects.

Various embodiments are described wherein accessing the child object includes modifying the Diameter message, and transmitting the message includes transmitting a modified version of the Diameter message.

Various embodiments are described wherein the child object corresponds to a multi-valued attribute value pair (AVP) carried by the Diameter message.

BRIEF DESCRIPTION OF THE DRAWINGS

In order to better understand various exemplary embodiments, reference is made to the accompanying drawings, wherein:

FIG. 8 illustrates an exemplary method for determining a total number of values belonging to a message; and FIG. 9 illustrates an exemplary method determining a total number of values belonging to a multi-valued object.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Diameter Routing Agents (DRAB) available today provide only basic functionalities typically defined in hard coding or scripting. As such, users may typically not be empowered to easily and flexibly define more complex behaviors for a DRA. In view of the foregoing, it would be desirable to provide a method and system that facilitates user definition and extension of DRA message processing behavior. For example, it would be desirable to provide an intuitive interface that enables a user to define rules that access and manipulate various multi-valued attribute value pairs (AVPs) carried by a Diameter message.

Figure 1:
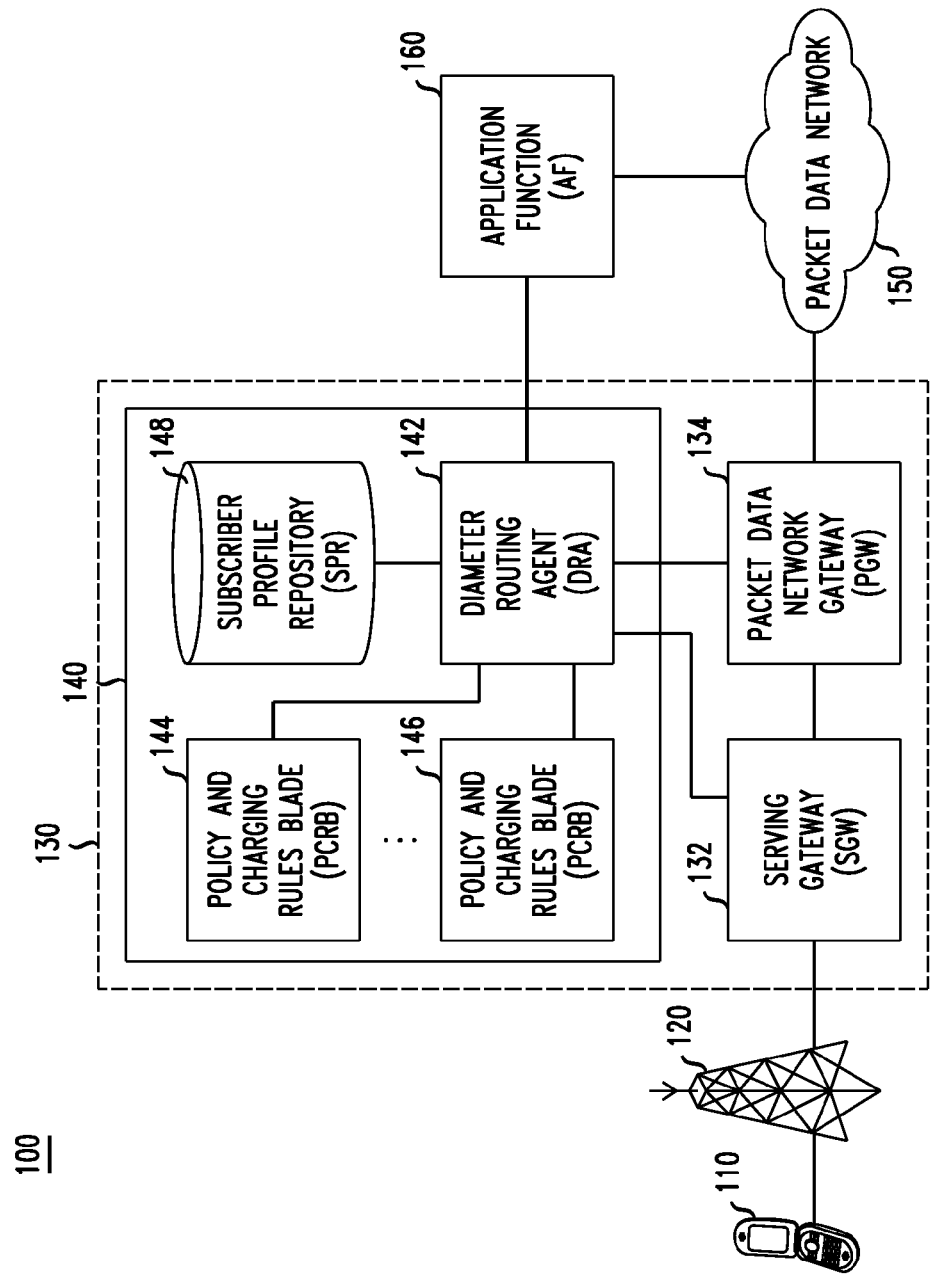
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository 148.

As will be described in greater detail below, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 138 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100. In various embodiments, the DRA 142 may provide similar support to applications defined according to other protocols. For example, the DRA 142 may additionally provide support for RADIUS or SS7 applications. Various modifications to the techniques and components described herein for supporting such other protocols will be apparent.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
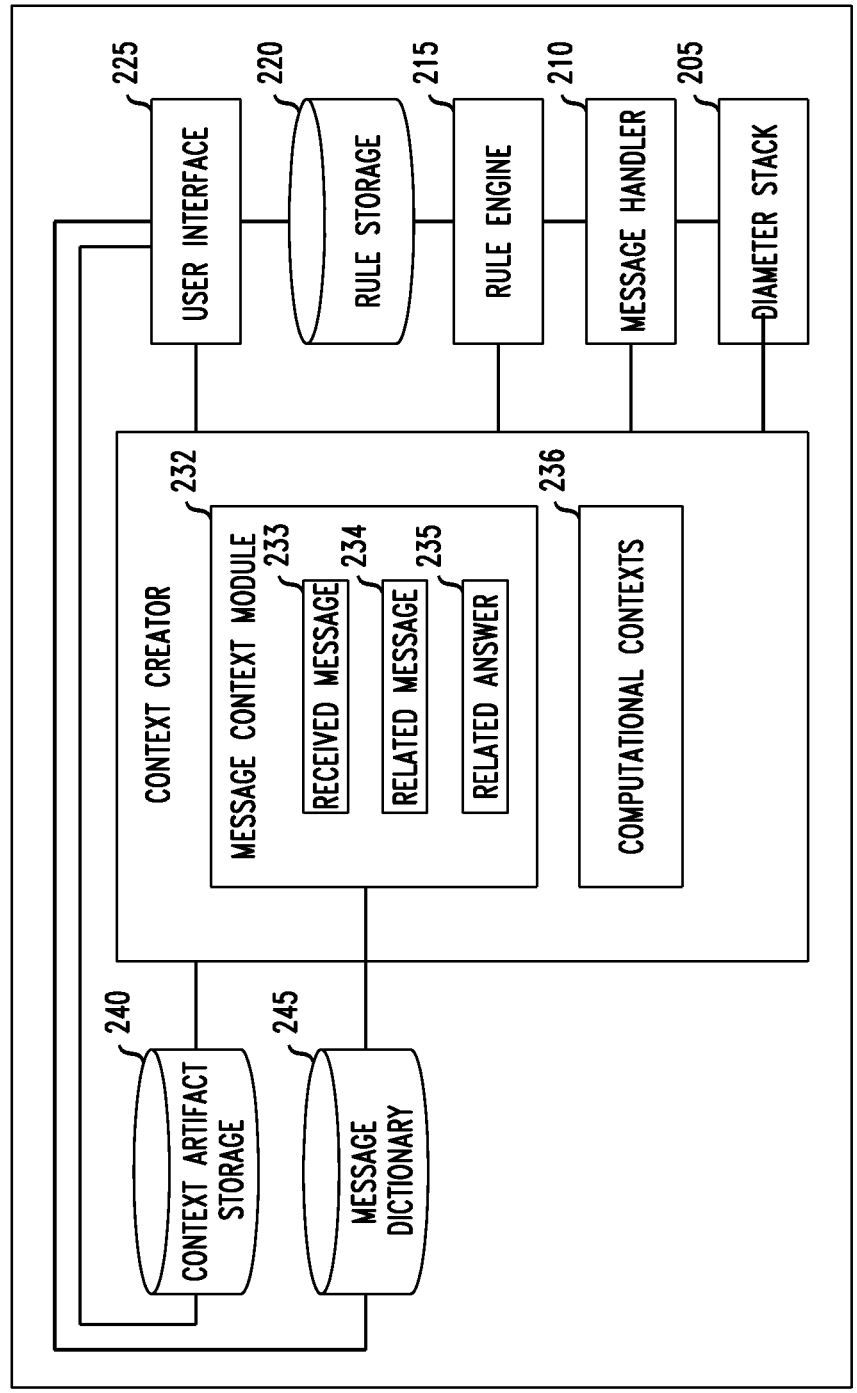
FIG. 2 illustrates an exemplary Diameter Routing Agent.

FIG. 2 illustrates an exemplary Diameter Routing Agent (DRA) 200. DRA 200 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, user interface 225, context creator 230, context artifact storage 240, or message dictionary 245.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmer's interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After the rule engine 215 finishes evaluating one or more rules, message handler 210 may transmit one or more messages via Diameter stack based upon one or more context object actions invoked by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more results of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structures for storing a rule set will be apparent.

It will be understood that, while various components are described as being configured to perform functions such as evaluating rules or accessing context objects based on rules, such configurations may not require any rules to be present in rule storage. For example, rule engine 215 may be configured to evaluate a rule including a context object reference even if no such rule is stored in rule storage 220. Thereafter, if a user adds such a rule to rule storage, rule engine 215 may process the rule as described herein. In other words, as used herein, the phrase "configured to" when used with respect to functionality related to rules will be understood to mean that the component is capable of performing the functionality as appropriate, regardless of whether a rule that requests such functionality is actually present.

User interface 225 may include hardware or executable instructions on a machine-readable storage medium configured to enable communication with a user. As such, user interface 225 may include a network interface (such as a network interface included in Diameter stack 205), a monitor, a keyboard, a mouse, or a touch-sensitive display. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art.

According to various embodiments, rule storage 220 may include rules that reference one or more "contexts" or "context objects." In such embodiments, context creator 230 may include hardware or executable instructions on a machine-readable storage medium configured to instantiate context objects and provide context object metadata to requesting components. Context objects may be instantiated at run time by context creator 230 and may include attributes or actions useful for supporting the rule engine 215 and enabling the user to define complex rules via user interface 225. For example, context creator 230 may provide context objects representing various Diameter messages, previous routing decisions, or subscriber profiles.

Upon DRA 200 receiving a Diameter message to be processed, message handler 210 may send an indication to context creator 230 that the appropriate context objects are to be instantiated. Context creator 230 may then instantiate such context objects. In some embodiments, context creator 230 may instantiate all known context objects or may only instantiate those context objects actually used by the rule set to be applied by rule storage 220. In other embodiments, context creator 230 may not instantiate a context object until it is actually requested by the rule engine 215.

Context creator 230 may additionally facilitate rule creation by providing context metadata to user interface 225. In various embodiments, context creator 230 may indicate to user interface 225 which context objects may be available for a rule set being modified and what attributes or actions each context object may possess. Using this information, user interface 225 may present a point-and-click interface for creating complex rules. For example, user interface 225 may enable the user to select a desired attribute or action of a context object from a list for inclusion in a rule under construction or modification.

Context creator 230 may rely on one or more context artifacts stored in context artifact storage 240 in establishing context objects. As such, context artifact storage 240 may be any machine-readable medium capable of storing one or more context artifacts. Accordingly, context artifact storage 240 may include a machine-readable storage medium such as read-only memory (ROM), random-access memory (RAM), magnetic disk storage media, optical storage media, flash-memory devices, and/or similar storage media. Context artifact storage 240 may store artifacts in various forms such as, for example, run-time libraries. In various embodiments, such run-time libraries may be stored as Java archive (.jar) files.

Each context artifact may define the attributes or actions available for a context object. In various embodiments, the context artifact may define one or more functions to be executed when an attribute or action is accessed. Such functions may utilize other functionality of the DRA 200, such as accessing the API of the Diameter stack, or may return values to the component that called the attribute or action. The context artifact may also include tags or other metadata for context creator 230 to provide to user interface 225 for describing the actions and attributes of the context object. In exemplary DRA 200, context artifact storage 240 may store context artifacts defining a message context, a load balancer context, or a system context. These context artifacts may be used by context creator 230 at run-time to instantiate different types of context objects. As such, context creator 230 may be viewed as including a message context module 232, and a computational contexts module 236. In various embodiments, a user may be able to define new context artifacts via user interface 225 for storage in context artifact storage, such as by specifying an existing file (e.g. a .jar file).

Message context module 232 may represent the ability of context creator 230 to generate context objects representing and providing access to Diameter messages. For example, message context module 232 may generate a context object representing the received message. In various embodiments, message context module 232 may also be configured to generate a context object representing a request message or an answer message associated with the received Diameter message, as appropriate. As such, message context module 232 may be viewed as including a received message submodule 233, a related request submodule 234, and a related answer submodule 235.

The contents of Diameter messages may vary depending on the application and command type. For example, an Rx RAA message may include different data from a GX CCR message. Such differences may be defined by various standards governing the relevant Diameter applications. Further, some vendors may include proprietary or otherwise non-standard definitions of various messages. Message context module 232 may rely on message definitions stored in message dictionary 245 to generate message contexts for different types of Diameter messages. For example, upon receiving a Diameter message, message handler 210 may pass the application and command type to the context creator 230. Message context module 232 may then locate a matching definition in message dictionary 245. This definition may indicate the AVPs that may be present in a message of the specified type. Message context module 232 may then instantiate a message context object having attributes and actions that match the AVPs identified in the message definition.

Some AVPs included in various Diameter messages may include multiple additional AVPs therein. Such AVPs may be referred to as "grouped" AVPs. For example, an Rx AAR message may include one or more Media-Component-Description AVPs, which may include multiple Media-Sub-Component AVPs, a Media-Component-Number AVP, a Media-Type AVP, and additional AVPs. As such, a Media-Component-Description AVP may be referred to as a grouped AVP. As another example, a Media-Sub-Component AVP may include multiple Flow-Description AVPs and, therefore, may be referred to as a grouped AVP.

Further, some AVPs may appear in a message multiple times, either at the top message level or within the same grouped AVP. Such AVPs may be referred to as "multi-valued" AVPs. In the above example, both the Media-Component-Description AVPs and Media-Sub-Component AVPs may be multi-valued because these AVPs may appear multiple times within a message or parent AVP. The Flow-Description AVPs, likewise, may also be multi-valued AVPs because each Media-Sub-Component AVP may include up to two Flow-Description AVPs.

Message context objects representing messages that include multi-valued AVPs may provide the user with various mechanisms for specifying which instances of AVPs within a collection of similarly-named AVPs are to be read, modified, or otherwise accessed. In various embodiments, each set of multi-valued AVPs may be associated with a read index and a write index that specify which item within the collection should be read from or written to, respectively. For example, if a current read index for Media-Component-Description is set to "3" (and assuming that the index sequence begins at "0"), any access to an attribute of the Media-Component-Description (or of any child element thereof) will be performed on the fourth Media-Component-Description AVP of the message. In a similar manner, a current write index for the Media-Component-Description is set to "0" and a current write index for the Media-Sub-Component is set to "2," any access to an action of a Media-Sub-Component (or any child element thereof) will be performed on the third Media-Sub-Component AVP of the first Media-Component-Description AVP in the message. It will be appreciated that, through the use of such indices, various functionality may be realized in user-defined rules such as, for example, iteration through all or some AVPs of a specified type, insertion of a value at a particular index within a collection of values, or removal of a value at a particular index within a collection of values.

As will be understood, the separation of the indices into read indices and write indices may provide an added layer of flexibility to users in designing rules. For example, by providing separate indices, the DRA 200 provides a user with the capability to copy or move an AVP or value thereof from one part of the message (based on the read indices) to another (based on the write indices). Further, the indices enable this movement of information within the message to be performed at different levels within the message hierarchy. For example, a value may be copied from a Subscription-ID AVP to a Flow-Description AVP.

Various objects may be described herein as "child objects" or "grandchild objects." It will be understood that, while such terms relate to an object's position within a hierarchy, these terms do not imply any specific generational level. With respect to the term "child object," this term will be understood to mean that the object belongs to some parent object and may reside at any hierarchical level. For example, the Media-Component-Description, Media-Sub-Component, and Flow-Description objects described herein may all be referred to as child objects of an Rx AAR message context object. With respect to the term "grandchild object," this term will be understood to mean that an object belongs to some parent object which, in turn, is a child object to some grandparent object, and may reside at any hierarchical level. For example, when a Media-Component-Description has been referred to as a child object of an Rx AAR message context object, the Media-Sub-Component, and Flow-Description objects may both be referred to as grandchild objects of the Rx AAR message context object.

Multi-valued objects may provide additional functionality to the rules engine with respect to the indices described above. For example, such objects may provide attributes that indicate how many AVPs are located within a multi-valued object at the currently set read indices and that indicate how many AVPs of a particular type are located within the message, regardless of the indices associated therewith. Further, such object may provide access to all AVPs at the same time. For example, a condition that specifies a predetermined token denoting that all AVPs should be accessed, the condition may return true if any AVP within the message (regardless of any currently-set indices) matches the criteria. Various techniques for realizing this indexed functionality will be described in greater detail below.

Message dictionary 245 may be any machine-readable medium capable of storing one or more context artifacts. Accordingly, message dictionary 245 may include a machine-readable storage medium such as read-only memory (ROM), random-access memory (RAM), magnetic disk storage media, optical storage media, flash-memory devices, and/or similar storage media. Message dictionary 245 may include various message definitions in appropriate forms such as, for example, XML files. Message dictionary 245 may include a number of predefined definitions included with the DRA 200 by a supplier. In various embodiments, a user may be able to provide new, user-defined message definitions via user interface 225. For example, if the user wishes to support an application not already defined by the predefined definitions, the user may generate or otherwise obtain a definition file for storage in message dictionary 245. In various embodiments, the user-defined definitions may be stored in a different portion of message dictionary, such as a different directory, from the predefined definitions.

In various embodiments, the user may also be able to extend predefined definitions via user interface 225. The user may be able to provide extension definitions that define new AVPs or specify additional AVPs to occur in a particular message type. For example, a user may wish to support a proprietary AVP within an Rx AAR. To provide such support, the user may provide a definition file, such as an XML file, defining the proprietary AVP and indicating that the proprietary AVP may be present in an Rx AAR. Such extension definitions may also be stored in a different area of message dictionary 245 from the predefined definitions. Message context module 232 may be configured to apply any applicable extension definitions when instantiating a new message context object or providing context metadata to user interface 225.

As noted above, upon receiving a Diameter message, message handler 210 may extract the application and command type and pass this information to context creator 230, which then may locate any applicable definitions to instantiate a new received message context object. Received message submodule 233 may be further configured to associate the new context object with the received Diameter message itself. For example, received message submodule 233 may copy the received Diameter message from Diameter stack 205 into a private or protected variable. Alternatively, received message submodule 233 may store an identification of the Diameter message useful in enabling access to the Diameter message via the API of the Diameter stack 205.

In various embodiments, DRA 200 may support the use of inverse message contexts. In such embodiments, upon extracting the command type from the received Diameter message, message handler 210 may identify the inverse command type as well. In some such embodiments, message handler 210 may implement a look-up table identifying the inverse for each message command. For example, upon determining that a received Diameter message is a Gx CCR, the message handler may determine that the inverse message would be a Gx CCA. Message handler 210 may pass this information to context creator 230 as well.

Upon receiving an inverse message type, message context module 232 may instantiate an inverse message context object in a manner similar to that described above with regard to the received message context object. Related request submodule 234 or related answer submodule 235, as appropriate, may also associate the new context object with message data.

If the inverse message is a request message, related request module 234 may identify a previously-processed request message stored in Diameter stack 205 and associate the message with the new context object in a manner similar to that described above. In various embodiments, upon receiving an answer message, Diameter stack 205 may locate the previously-processed and forwarded request message to which the answer message corresponds. Diameter stack 205 may present this related request message through the API for use by context creator 230 or other components of DRA 200. By associating the previous request message with the related request context object, rule engine 215 may be provided with attributes capable of accessing the AVPs carried by the request message that prompted transmission of the answer message being processed.

When the inverse message is an answer message, on the other hand, related answer module 235 may construct a new answer message by, for example, requesting, via the API, that Diameter stack 205 construct the answer message. The new answer message may be completely blank or may include at least some values copied over from the received Diameter request message. Related answer module 235 may associate the new context object with the new answer message in a manner similar to that described above with respect to received message module 233. The related answer context object may then provide rule engine 215 with access to various actions capable of modifying the new answer message. For example, the rule engine may utilize an action of the related answer context object to set a result-code AVP of the answer message, thereby indicating to the message handler 210 that the answer should be sent back to the device that sent the received request. Message handler 210 may also then refrain from forwarding the received request message to any other devices.

As noted above, context creator 230 may be capable of defining other context objects that do not represent a Diameter message. Such context objects may be referred to as "computational contexts" and may also be defined by contexts artifacts in context artifact storage 240. As such, the context creator 230 may be seen to include a computational contexts module 236 that instantiates computational contexts for use by the rule engine 215. Exemplary computational contexts may include objects that provide access to a subscription profile, a previous routing decision, a load balancer, and system level functions. Various additional computational contexts will be apparent.

It should be noted that while rule storage 220, context artifact storage 240, and message dictionary 245 are illustrated as separate devices, one or more of these components may be resident on multiple storage devices. Further, one or more of these components may share a storage device. For example, rule storage 220, context artifact storage 240, and message dictionary 245 may all refer to portions of the same hard disk or flash memory device.

Figure 3:
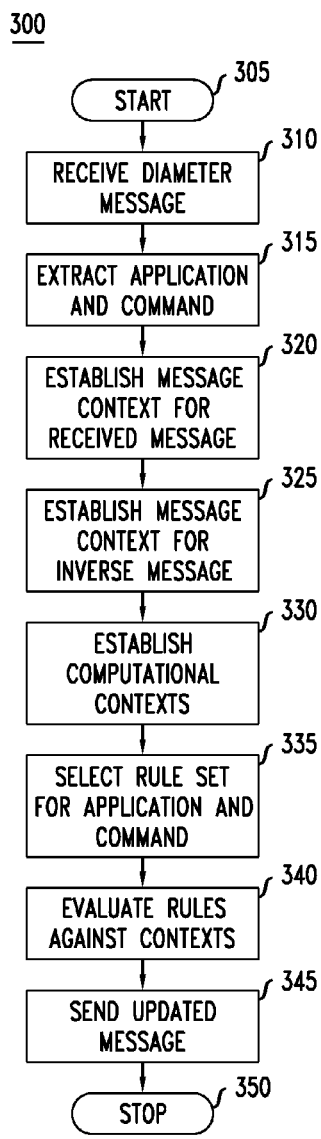
FIG. 3 illustrates an exemplary method for processing Diameter messages.

FIG. 3 illustrates an exemplary method 300 for processing Diameter messages. Method 300 may be performed by the components of DRA 200 such as, for example, Diameter stack 205, message handler 210, rule engine 215, or context creator 230.

Method 300 may begin in step 305 and proceed to step 310 where the DRA 200 may receive a Diameter message to be processed. Next, in step 315, the DRA 200 may extract a message type from the received Diameter message. In various embodiments, the message type may be defined by the application and command type of the message. Then, in step 320, the DRA may use the extracted message type to establish a message context object to wrap the received Diameter message. In a similar manner, the DRA 200 may establish a message context object for an inverse of the Diameter message in step 325. For example, the DRA 200 may use a lookup table to identify the inverse message type of the extracted message type and request a new message context based on the inverse message type.

The DRA 200 may then, in step 330, proceed to establish any other computational context objects for which the DRA 200 stores a context artifact or which the rule engine may request. For example, the DRA 200 may establish a routing decision context object and a subscriber record context object. After the appropriate context objects have been at least instantiated, method 300 may proceed to step 335 where the DRA 200 may select one or more appropriate rule sets to evaluate in processing the received Diameter message. In various embodiments, the DRA 200 may store a rule set for each message type. In some embodiments, DRA 200 may additionally or alternatively store a rule set that is generally applicable to all Diameter messages, all Diameter messages of a particular application, or another subset of Diameter messages.

After identifying the appropriate rule sets, the DRA 200 may evaluate the selected rule set or tables against the instantiated contexts in step 340. The individual rules may include references to various components of the context objects, herein referred to as "context object references." Such components may constitute attributes or actions of the context objects. To evaluate a rule including such a reference, the DRA may access the referenced component. For example, an attribute of a context object may be used in a comparison to determine whether a rule is applicable or an action of a context object may be used in applying the result of a rule. Various additional uses for a reference to a context object will be apparent. After applying the appropriate rule sets, the DRA 200 may transmit one or more messages to other devices in step 345. For example, the DRA may forward the Diameter message, which may be modified, to another device or may transmit an answer back to the device that sent the received message. Method 300 may proceed to end in step 350.

Figure 4:
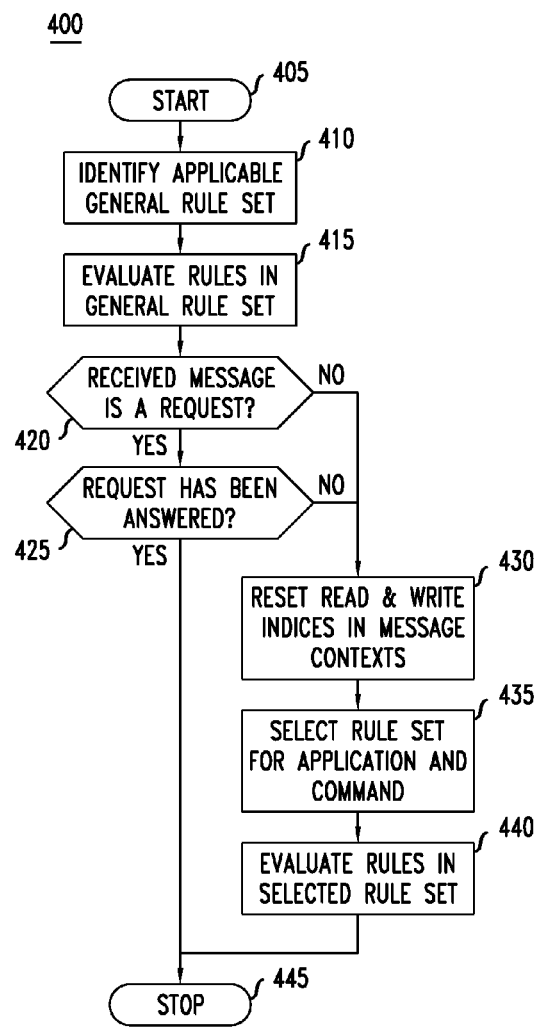
FIG. 4 illustrates an exemplary method for evaluating multiple rule sets.

As noted above, steps 335 and 340 may involve the evaluation of different types of rule sets. For example, in some embodiments, each message type may be associated with a rule set which applies to message of that type. Thus, one rule set may be applied for Gx CCR messages while a different rule set may be applied for Rx AAR messages. Some embodiments may also include rule sets that are generally applicable to all Diameter messages, all Diameter requests, or all Diameter answers. In such embodiments, the DRA 200 may evaluate multiple rule sets in sequence. Further, each of these "public" or "top-level" rule sets may themselves invoke the evaluation of one or more "private" or "lower level" rule sets. FIG. 4 illustrates an exemplary method 400 for evaluating multiple rule sets. Method 400 may be performed by the components of DSC 200 in place of steps 335, 340 of method 300.

Method 400 may begin in step 405 and proceed to step 410 where the DRA 200 may identify a general rule set that is applicable to the message received in step 310. For example, the DRA 200 may include a rule set that is generally applicable to all messages, all Diameter messages, all Diameter requests, or all Diameter answers. For example, if the received message is a GX CCR, the DRA 200 may identify the general rule set for all Diameter requests. Then, in step 415, the DRA 415 may evaluate the identified rule set. In doing so, the DRA 200 may modify the received message or generate a different Diameter message to be sent back to the origin device. Further, evaluation of this public rule set may involve the invocation of one or more additional private rule sets.

After evaluating the general rule set, method 400 may proceed to step 420 where the DRA 200 may determine whether the received message was a request message. If the message was a request message, method 400 may proceed to step 425 where the DRA 200 may determine whether the request has been answered. For example, during step 415, the DRA 200 may generate or modify a Diameter answer message. In step 425, the DRA 200 may determine whether a result-code AVP or experimental-result AVP of the Diameter answer has been set to determine whether an answer message has been constructed for transmission to the origin device. If so, method 400 may proceed to end in step 445 without evaluating any additional rules. The DRA 200 may proceed to transmit the answer message back to the origin device, for example, in step 345 of step 300.

If, on the other hand, the received message is not a request message or has not been answered in step 415, method 400 may proceed to step 430. In step 430, the DRA 200 may reset any read and write indices associated with any of the message contexts that have been established. In this manner, each public rule set can be created by the user with the presumption that the indices for each set of multi-valued AVPs begins at zero. Next, in step 435, the DRA 200 may select a second rule set that is applicable to the received message. In various embodiments, the DRA 200 may locate a rule set associated with the application and command type of the received message. For example, if the received Diameter message is a Gx CCR, the DRA 200 may identify a rule set associated with Gx CCR messages. Then, in step 440, the DRA 200 may invoke the rule engine a second time. This invocation may involve passing the rule set identified in step 435 to the rule engine, instead of the rule set identified in step 410. Thus, the DRA 200 may evaluate the rule set specifically associated with the message type of the received Diameter message in step 440. Again, evaluation of the second rule set may involve the invocation of one or more additional private rule sets. Method 400 may proceed to end in step 445. In various embodiments, the DRA 200 may proceed to step 345 of method 300 after completing method 400.

Various modifications will be apparent for method 400. For example, in some embodiments, more than two rule sets may be applicable to a received Diameter message. In such embodiments, method 400 may invoke the rules engine more than twice. Further, in such embodiments, the DRA 200 may perform step 430 prior to the invocation of each public rule set. As another example, various embodiments may evaluate all applicable rule sets before determining whether a request has been answered, or may not determine whether a request has been answered at all.

In some embodiments, each rule set may include multiple public rule tables that may each invoke one or more private rule tables. In such embodiments, steps 415 and 435 may involve multiple invocations of the rule engine with different public rule tables belonging to the appropriate rule set. In such embodiments, the read and write indices may be reset before the invocation of each public rule table. As such, in such embodiments, method 400 may be modified so that steps 415 and 435 may include multiple executions of step 430 as substeps thereof.

As noted above, message types may be defined by various definitions. For example, a DRA may include one or more predefined definitions stored in a message dictionary by an equipment provider. In various embodiments, such predefined definitions may be stored as extensible markup language (XML) files. For example, a predefined definition for an Rx AAR message may read, in part:

```xml
< diameterDefinition xmlns = "diameterDefinition"
xmlns:tns = "diameterDefinitionContext" >
    < application id = "16777236" vendorName = "IETF_IANA" name = "Rx"
    stateful = "true" support = "AUTHORIZATION_REQUESTS" >
        < commandSyntax name = "AAR" >
            < fixed index = "0" attributeName = "Session-Id" / >
            < required attributeName = "Auth-Application-Id" / >
            < required attributeName = "Origin-Host" / >
            < required attributeName = "Origin-Realm" / >
            < required attributeName = "Destination-Realm" / >
            < optional attributeName = "Destination-Host" / >
            < optional attributeName = "Media-Component-Description" >
                < occurrence min = "0" max = "unbounded" / >
            < /optional >
            < optional attributeName = "SIP-Forking-Indication" / >
            < optional attributeName = "Subscriber-ID" >
                < occurrence min = "0" max = "unbounded" / >
            < /optional >
            < optional attributeName = "Supported-Features" >
                < occurrence min = "0" max = "unbounded" / >
            < /optional >
        < /commandSyntax >
    < /application >
    ...
    < attribute code = "517" vendorName = "3GPP" name = "Media-Component-
    Description" format = "GROUPED" mFlag = "REQUIRED" pFlag = "OPTIONAL"
    vFlag = "REQUIRED" encrypt = "true" register = "true" proprietary = "false" >
        < groupedAttributeSyntax acceptsOtherAvps = "false" >
            < required attributeName = "Media-Component-Number" / >
            < optional attributeName = "Media-Sub-Component" >
                < occurrence min = "0" max = "unbounded" / >
            < /optional >
            < optional attributeName = "AF-Application-Identifier" / >
            < optional attributeName = "Media-Type" / >
            < optional attributeName = "Max-Requested-Bandwidth-UL" / >
            < optional attributeName = "Max-Requested-Bandwidth-DL" / >
            < optional attributeName = "Flow-Status" / >
            < optional attributeName = "Reservation-Priority" / >
            < optional attributeName = "RS-Bandwidth" / >
            < optional attributeName = "RR-Bandwidth" / >
            < optional attributeName = "Codec-Data" >
                < occurrence min = "0" max = "2" / >
            < /optional >
        < /groupedAttributeSyntax >
    < /attribute >
    < attribute code = "518" vendorName="3GPP" name = "Media-Component-
    Number" format = "UNSIGNED32" mFlag = "REQUIRED" pFlag = "OPTIONAL"
    vFlag = "REQUIRED" encrypt = "true" register = "true" proprietary = "false" / >
    < attribute code = "519" vendorName ="3GPP" name = "Media-Sub-Component"
    format = "GROUPED" mFlag = "REQUIRED" pFlag = "OPTIONAL"
    vFlag = "REQUIRED" encrypt = "true" register = "true" proprietary = "false" >
        < groupedAttributeSyntax >
            < required attributeName = "Flow-Number" / >
            < optional attributeName = "Flow-Description" >
                < occurrence min = "0" max = "2" / >
            < /optional >
            < optional attributeName = "Flow-Status" / >
            < optional attributeName = "Flow-Usage" / >
            < optional attributeName = "Max-Requested-Bandwidth-UL" / >
            < optional attributeName = "Max-Requested-Bandwidth-DL" / >
            < optional attributeName = "AF-Signalling-Protocol" / >
        < /groupedAttributeSyntax >
    < /attribute >
    < attribute code = "520" vendorName ="3GPP" name = "Media-Type"
    format = "ENUMERATED" mFlag = "OPTIONAL" pFlag = "OPTIONAL"
    vFlag = "REQUIRED" encrypt = "true" register = "true" proprietary = "false" / >
< /diameterDefinition >
```

The above example message definition may define the Rx AAR message as including a number of required and optional AVPs such as the Session-ID AVP and Media-Component-Description AVP. The above example message definition may also define the structure or of at least some AVPs that may be included within a Rx AAR, such as a Media-Component-Number AVP and Flow-Status AVP. Such AVPs may include a value or may be grouped and include additional AVPs. Further, some AVPs may be associated with a tag that specifies a maximum number of occurrences of that AVP within the top message level or parent AVP, thereby indicating that the AVP may be multi-valued. Various additional methods of defining the contents of a message type will be apparent. In various embodiments, user-defined definitions may include a similar syntax as the predefined message definition above. User-defined definitions may be provided by a user of the DRA, such as an administrator or the equipment provider after the equipment has been deployed.

Figure 5:
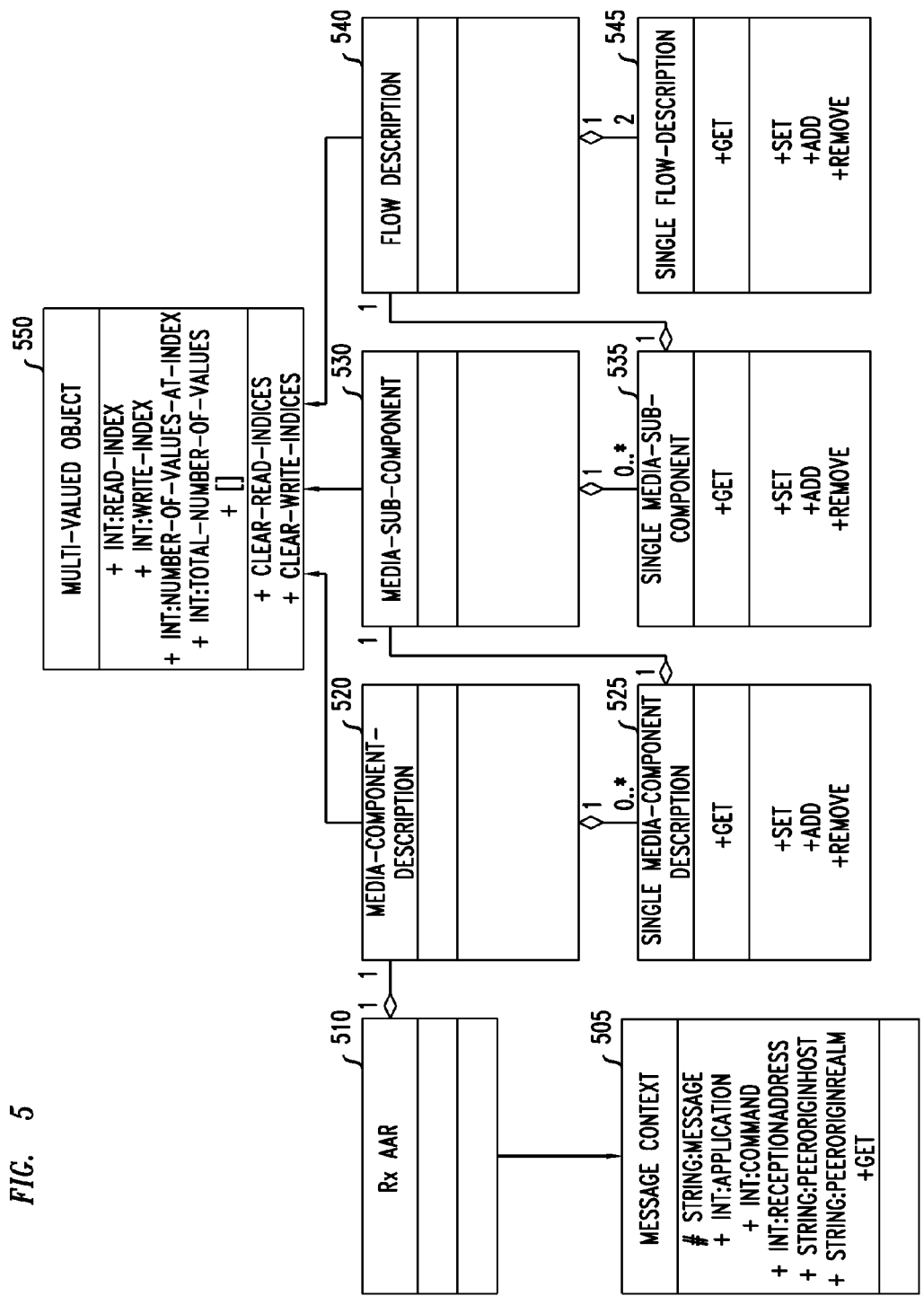
FIG. 5 illustrates an exemplary class diagram for a message context object.

FIG. 5 illustrates an exemplary class diagram 500 for a message context object. Class diagram 500 may represent a message context object instantiated based on the exemplary message definition and extension definition above. Rx AAR context object 510 may be associated with a received Rx AAR Diameter message currently being processed by the DRA 200 or may be associated with a previously processed Rx AAR Diameter message that is related to an Rx AAA currently being processed by the DRA. Class diagram 500 may indicate an actual implementation of a message context object or may describe a context object as viewed by a user even though an actual implementation differs. For example, as will be understood, a message context object may be implemented as a generic "Diameter message" class where the contents may include generic "AVP" objects that hold underlying binding data. Such AVP objects may be instantiated only on demand. Such an implementation may be accessible by a user in the same manner as an object implemented according to class diagram 500.

Rx AAR context object 510 may extend, or otherwise be a specific instantiation of a base message context object 505. Message context object 505 may define data and functions that may be generally used by any message context object regardless of the message type. In various embodiments, message context object 505 may provide access to the Diameter message by, for example, storing a protected copy of the Diameter message in a "message" variable or storing information sufficient to access the Diameter message actually stored by the Diameter stack.

Base message context object 505 may also provide various data related to the Diameter message, but not actually stored within the message, such as data associated with the message by the Diameter stack. For example, the message context object 505 may include public variables storing identifications of an application, command, reception address, peer origin host, and peer origin realm. The message context object 505 may also include a "get" attribute that may return a handle to the message object itself that may be used, for example, to access other objects contained within message context object 505. In various embodiments, a rule may simply reference the object name to access a "get" attribute, without specifying the "get" attribute itself. For example, a rule may reference "Rx AAR.Session-ID" to retrieve the Session-ID value, instead of "Rx AAR.Session-ID get."

Rx AAR context object 510 may inherit attributes or actions from message context 505, while including additional attributes or actions that are specific to an Rx AAR message. It will be understood that context objects instantiated based on other message type definitions or extension definitions may include different objects, as specified by those definitions. Thus, Rx AAR context object 510 may include a number of nested objects representing various possible AVPs. For example, Rx AAR context object 510 may include a Media-Component-Description object 520 representing the various Media-Component-Description AVPs carried by the underlying message. The Rx AAR context object 510 may include one such Media-Component-Description object 520 that provides access to zero or more Single Media-Component-Description Objects 525. Each such Single Media-Component-Description object 525 may correspond to one of the Media-Component-Description AVPs of the underlying message. As such, the Media-Component-Description object 520 may function as a container for all of the individual objects representing the Media-Component-Description AVPs. The Single Media-Component-Description objects 525 may provide access to the underlying data via various actions or attributes such as a "get" attribute along with "set," "add," and "remove" actions. As noted above, in various rules, the "get" and "set" methods may not be explicitly invoked and, instead, may be inferred based on the context of an access to the Single Media-Component-Description object 525 itself. In various embodiments wherein the underlying message does not include any Media-Component-Description AVPs, the Rx AAR object 510 may not include any Media-Component-Description object 520.

Each Single Media-Component-Description object 525 may include a Media-Sub-Component object 530 which, in turn, may store zero or more Single Media-Sub-Component objects 535 that each correspond to a Media-Sub-Component AVP in the underlying message. The Single Media-Sub-Component objects 535 may provide access to the underlying data via, for example, a "get" attribute along with a "set," "add," and "remove" actions. In various embodiments wherein an underlying Media-Component-Description AVP does not include any Media-Sub-Component AVPs, the associated Single Media-Component-Description object 525 may not include any Media-Sub-Component object 530.

In a similar manner, each Single Media-Sub-Component object 535 may include a Flow-Description object 540 which, in turn, may store between zero and two Single Flow-Description objects 545 that each correspond to a Flow-Description AVP in the underlying message. The Single Flow-Description objects 545 may provide access to the underlying data via, for example, a "get" attribute along with a "set," "add," and "remove" actions. In various embodiments wherein an underlying Media-Sub-Component AVP does not include any Flow-Description AVPs, the associated Single Media-Sub-Component object 535 may not include any Flow-Description object 540.

While FIG. 5 shows various container objects 520, 530, 540 as not providing any actions or attributes themselves, various embodiments may define functionality within these container objects 520, 530, 540. For example, the various "add" actions of the single objects 525, 535, 545 may instead be implemented at the container objects 520, 530, 540. Various other functionality for the container objects 520, 530, 540 and other implementations will be apparent.

Each of the container objects 520, 530, 540 may extend a Multi-Valued Object base class 550. As such, the container objects 520, 530, 540 may be referred to as multi-valued objects themselves. The Multi-Valued Object base class 550 may provide various functionality regarding the indexing of the singular object contained therein. For example, the Multi-Valued Object base class 550 may include integer values for a Read-Index and a Write-Index. The Multi-Valued Object base class 550 may also include a method for use in accessing a child object. This method may, for example, parse an instruction that accesses a multi-valued object to determine whether the instruction invokes an attribute or action and, then, return the child object located at the Read-Index or Write-Index, respectively. Thus, an instruction that reads "Rx AAR.Media-Component-Description.Media-Sub-Component remove" may be evaluated by first locating the Single Media-Component-Description object 525 located at the Write-Index of Media-Component-Description object 520, and then removing the Single Media-Sub-Component object 535 located at the Write-Index of the Media-Sub-Component object 535 belonging to the Single Media-Component-Description object 525.

The Multi-Valued Object 550 base class may also include a number of helper attributes and actions. One such helper attribute may be a "Number-Of-Values-At-Index" attribute. This attribute may return an integer value representative of the number of objects contained in the currently-indexed container. For example, an instruction that accesses "Rx AAR.Media-Component-Description.Media-Sub-Component.Number-Of-Values-At-Index" while the Read-Index of the Media-Component-Description object 520 is set to "1" may cause the DRA 200 to first access the second Single Media-Component-Description object 525 (e.g., the object at index "1") within the Media-Component-Description object 520 and then return a count of the objects belonging to the Media-Sub-Component object 530 contained in the Single Media-Component-Description object 525. In other words, the "Number-Of-Values-At-Index" attribute may be used to determine how many AVPs of a particular type belong to a currently-indexed parent AVP. As such, this attribute may be used in creation of rules, for example, for establishing a bounds on a loop that iterates through all AVPs in a parent AVP.

Another helper attribute may be a "Total-Number-Of-Values" attribute. This attribute may return an integer value representative of the number of objects of a particular type across all containers, regardless of a current index for any parent objects. For example, an instruction that accesses "Rx AAR.Media-Component-Description.Media-Sub-Component.Total-Number-Of-Values" while the Read-Index of the Media-Component-Description object 520 is set to "1" may cause the DRA 200 to count the number of Single Media-Sub-Component objects 535 across all Single Media-Component-Description objects 525 (e.g., the number of Media-Sub-Component objects 535 located in the first, second, third, etc. Single Media-Component-Description objects 525). In other words, the "Number-Of-Values-At-Index" attribute may be used to determine how many AVPs of a particular type belong a Diameter message.

Yet another helper attribute may be accessed via a special token such as, for example, the accessor token "[ ]." This token may indicate to the rules engine that an instruction should be evaluated against all instances of a particular object type. For example, an instruction that accesses "Rx AAR.Media-Component-Description.Media-Sub-Component[ ]" will access all instances of the Single Media-Sub-Component object 535 within the Rx AAR message object 510. Thus, if the instruction includes a condition such as "Rx AAR.Media-Component-Description.Media-Sub-Component.Flow-Description[ ] contains foo," the rule would return true if any Flow-Description AVP of the Diameter message includes the string "foo."

Two helper actions may be the "Clear-Read-Indices" and "Clear-Write-Indices" actions. These actions may reset one or more Read-Index and Write-Index values to zero. In some embodiments, each action may reset only the read or write index of the multi-valued object to which the accessed method belongs, any read or write indices of child objects, or all read or write indices in the Rx AAR message. Additionally or alternatively, the Multi-Valued Object base class 550 may define a "Clear-Indices" action that clears both read and write indices.

It will be understood that the class diagram 500 illustrates one possible implementation of the index functionality described herein. Various modifications and alternative implementations will be apparent. For example, in various alternative embodiments, the Rx AAR 510 may include only one Media-Sub-Component object 530 and only one Flow-Description object 540 regardless of the number of Single Media-Component Description objects 525 and Single Media-Sub-Component objects 535, respectively. In such embodiments, the Read-Index and Write-Index values for a particular object type will apply to all objects of that type, regardless of which parent collection to which the object belongs. For example, if the Media-Sub-Component object 530 Read-Index is set to "3," this index may remain set to this value even if the Read-Index of the parent Media-Component-Description object 520 is changed.

Figure 6:
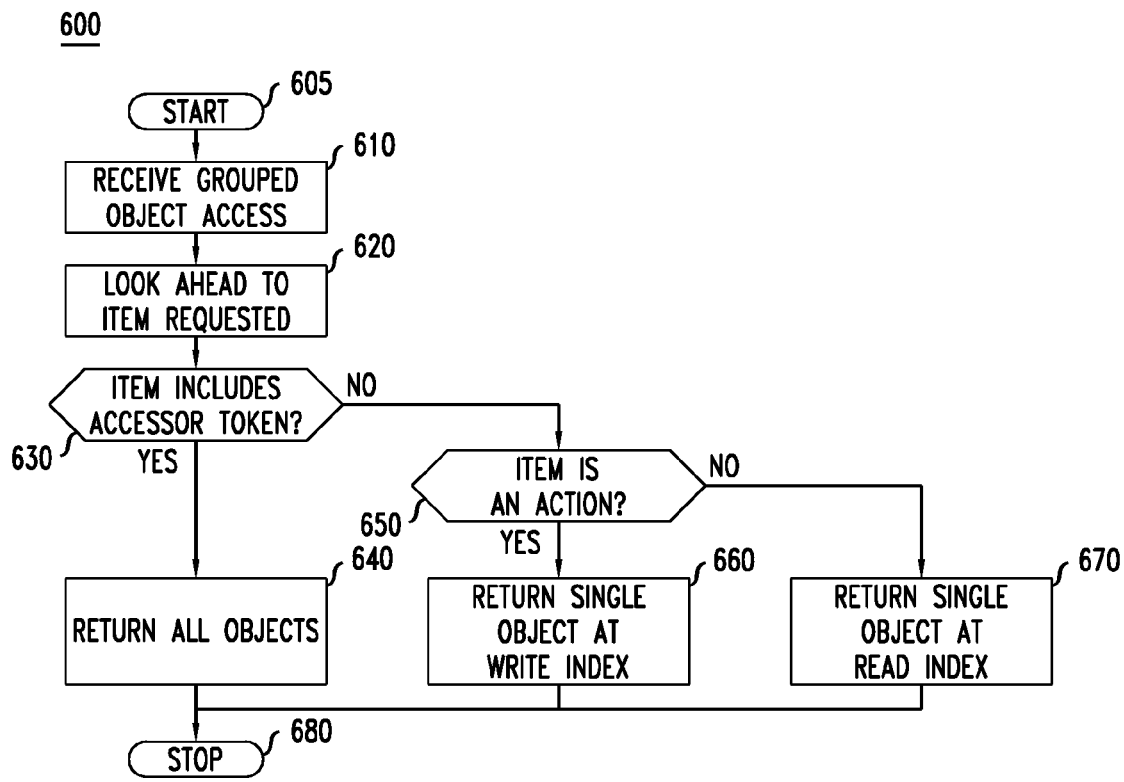
FIG. 6 illustrates an exemplary method for handling an access to a multi-valued object.

FIG. 6 illustrates an exemplary method 600 for handling an access to a multi-valued object. Method 600 may be performed by the components of the DRA 200 such as, for example, the rule engine 215 or context creator 230. Method 600 may be performed whenever a rule includes an instruction to access a multi-valued object. For example, if a rule requests access to the action "Rx AAR.Media-Component-Description.Media-Sub-Component Remove," method 600 may be executed twice: first to locate one or more appropriate Single Media-Component-Description objects and then to locate one or more appropriate single Media-Sub-Component objects.

Method 600 may begin in step 600 and proceed to step 610 where the DRA 200 may receive an instruction to access a multi-valued object. For example, the DRA 200 may, during evaluation of a rule, encounter an instruction that references an attribute or action within a multi-valued object of a message context. Next, in step 620, the DRA 200 may look ahead within the instruction to determine which item has been requested. In various embodiments, the DRA 200 may locate the final object referenced in the string or the attribute or action requested. For example, when processing the instruction "Rx AAR.Media-Component-Description.Media-Sub-Component Remove" to determine which Single Media-Component-Description objects should be returned, the DRA 200 may look ahead and determine that the requested item is "Media-Sub-Component Remove." Using this information, the DRA 200 may proceed to determine which object or objects to return.

In step 630, the DRA 200 may determine whether the requested item includes the accessor token "[ ]," thereby indicating that all objects within a set of multi-valued objects should be returned. It will be apparent that the choice of token is arbitrary and that any token may be utilized to invoke this functionality. If the requested item includes the token, then the method 600 may proceed to step 640 where the DRA 200 may return all objects within the multi-valued object for further processing by the rule engine 215. For example, the rule engine 215 may iterate through all of the returned objects, accessing the requested attribute or action for each. The method may then proceed to end in step 680, whereupon the rule engine 215 may proceed to further evaluate the current instruction or rule set.

If, on the other hand, the requested item does not include a token invoking the functionality of returning all child objects, the method may proceed from step 630 to step 650 where the DRA 200 may determine whether the requested item corresponds to an action or an attribute. This determination may be made, for example, by examining the context in which the rule invokes the requested item or by referring to a metadata record for an object. Various additional methods for making this distinction between attribute and action will be apparent. If the requested item is an action, the DRA 200 may return, in step 660, the single child object located at the current write index of the multi-valued object currently being accessed. If the requested item is an attribute, the DRA 200 may return, in step 670, the single child object located at the current read index of the multi-valued object currently being accessed. The method may proceed from either of steps 660, 670 to end in step 680, whereupon the rule engine 215 may proceed to further evaluate the current instruction or rule set. For example, if returned object includes a child object that is also a multi-valued object, the rule engine 215 may proceed to invoke method 600 again, this time with respect to the child object. In this manner, method 600 may provide access to specific child objects within various multi-valued object based on a previously set index value and without requiring the present instruction to presently specify an index value.

Figure 7:
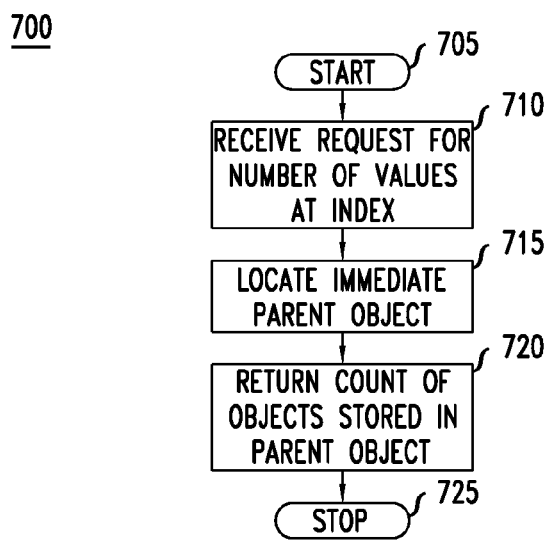
FIG. 7 illustrates an exemplary method for determining a count of values at a specified index.

FIG. 7 illustrates an exemplary method 700 for determining a count of values at a specified index. The method 700 may be performed by the components of the DRA 200 such as, for example, the rule engine 215 or context creator 230. The method 700 may correspond to a "Number-Of-Values-At-Index" attribute of a multi-valued object 550.

Method 700 may begin in step 705 and proceed to step 710 where the DRA 200 may receive an instruction to determine the number of values located at the current index. For example, the DRA 200 may, during evaluation of a rule, encounter an instruction that references a "Number-Of-Values-At-Index" attribute of a multi-valued object. Next, in step 715, the DRA 200 may locate an immediate parent object of the multi-valued object that owns the accessed "Number-Of-Values-At-Index" attribute. For example, if the encountered instruction is "Rx AAR.Media-Component-Description.Media-Sub-Component.Flow-Description.Number-Of-Values-At-Index," the DRA 200 may locate the Single Media-Sub-Component object or the Flow-Description collection object that contains the referenced Flow-Description. In various embodiments, step 715 may involve one or more executions of method 600 to "drill down" through the appropriate message context object, based on the currently-set Read-Indices, to locate the parent of the Flow-Description object. In other embodiments, method 600 may have already been executed one or more times to locate the referenced Flow-Description object prior to the rule engine invoking the "Number-Of-Values-At-Index" attribute in association with step 710. In the case where the Flow-Description container object implements the "Number-Of-Values-At-Index," step 715 may simply include a designation of "self" as the immediate parent object or may be skipped altogether.

Next, in step 720, the DRA 200 may return a count of all objects of the specified type stored in the parent object. Following in the above example, the DRA 200 may simply return a count of the number of items stored in the Flow-Description collection object. The method 700 may then proceed to end in step 725, whereupon the rule engine 215 may proceed to further evaluate the current instruction or rule set.

FIG. 8 illustrates an exemplary method 800 for determining a total number of values belonging to a message. The method 800 may be performed by the components of the DRA 200 such as, for example, the rule engine 215 or context creator 230. The method 700 may correspond to a "Total-Number-Of-Values" attribute of a multi-valued object 550.

Method 800 may begin in step 805 and proceed to step 810 where the DRA 200 may receive an instruction to determine the total number of values located in a Diameter message. For example, the DRA 200 may, during evaluation of a rule, encounter an instruction that references a "Total-Number-Of-Values" attribute of a multi-valued object. Next, in step 815, the DRA 200 may locate a top parent object for the requested object type. For example, if the encountered instruction is "Rx AAR.Media-Component-Description.Media-Sub-Component.Flow-Description.Total-Number-Of-Values-," the DRA 200 may locate the Rx AAR message context (as the topmost object) or the Media-Component-Description collection object (as the topmost collection object). Next, in step 820, the DRA 200 may invoke a helper function implemented by the top parent object. The helper function my descend through the top parent object's various child objects and count all instances of the object type for which the count was requested in step 810. An exemplary method of counting these object types will be described in greater detail below with respect to FIG. 9. After the helper function of the top parent finishes, the DRA 200 may receive the final count in the step 825 and then return the count in step 830. The method 800 may then proceed to end in step 835, whereupon the rule engine 215 may proceed to further evaluate the current instruction or rule set.

FIG. 9 illustrates an exemplary method 900 determining a total number of values belonging to a multi-valued object. Method 900 may be a helper function for use in conjunction with the "Total-Number-Of-Values" attribute and, as such, may be invoked in step 820 of method 800. The method 900 may be performed by the components of the DRA 200 such as, for example, the rule engine 215 or context creator 230.

Method 900 may begin in step 905 and proceed to step 910 where the object may receive a request for an object type count. For example, a message context object or collection object may receive an indication of the object type that is to be counted as part of the invocation of method 900. Next, in step 915, the object may determine if it directly stores objects of the requested type. For example, if the requested object type is "Media-Component-Description" and the object executing method 900 is a Media-Component-Description container object, then the object may determine that it indeed stores objects of the requested type. The method 900 may then proceed to step 920 where the object may simply count the number of child objects that the object stores matching the requested type and add the count to a total variable. Then, in step 950, the object may return the total variable to the requesting component or function and method 900 may proceed to end in step 955.

If, on the other hand, the object executing method 900 does not directly store objects of the requested type, method 900 may proceed from step 915 to step 925 where the object may retrieve a child object into which the object will "drill down" to count objects of the requested type. In some embodiments, the object may simply retrieve the first child object contained therein, or the object may retrieve a child object known to store, at some level, objects of the requested type. Next, in step 930, the current object executing method 900 may invoke a helper function implemented by the child object to determine a total number of values for a particular object type stored therein. In some embodiments, at step 930, the current object may invoke another execution of method 900, but this time as implemented by the child object rather than the current object. In this manner, method 900 may be seen as recursing or otherwise descending through the various levels of grouped objects stored in a message context object. After the child object finishes execution of the helper function (which may include further recursions or calls to other helper functions implemented by other objects), the current object may receive, in step 935, a count of the number of values of the requested object type stored within the child. The current object may then, in step 940, add the returned count to a total variable and, in step 945, determine whether additional child objects remain to be evaluated. Step 945 may take into account all child objects of the current object or only those child objects known to store objects of the requested type. If additional child objects remain, then method 900 may loop back to step 925. Once the counts of objects of the requested type within each of the child objects have been added to the total variable, method 900 may proceed to step 850 where the current object may return the total variable to the requesting object. For example, the current object may return the total variable to method 800 at step 925 or to another execution of method 900 at step 935. The method 900 may then proceed to end in step 955.

As will be understood, the various indexing-related functionality described herein may be advantageous in the creation of rules governing the behavior of a DRA. For example, an administrator may utilize this functionality to create rules that iterate over multiple AVPs of the same type contained in a single message. An exemplary rule set may read as follows:

that, in this manner, the rule may iterate through every Flow-Description object within the Rx AAR message context object.

According to the foregoing, various embodiments enable robust and dynamic handling of various Diameter messages at a diameter routing agent. In particular, by providing various

```
RULE TABLE: TraverseFlowDescriptions
IF (RULE MatchingRule)
    (Rx    AAR.Media-Component-Description.Media-Sub-Component.Flow-Description
           Equal "foo")
THEN
    Rx    AAR.Supported-Features.Feature-List.Add    Rx    AAR.Media-Component-
          Description.Read-Index) AND
    Rx    AAR.Supported-Features.Feature-List.Add    Rx    AAR.Media-Component-
          Description.Media-Sub-Component.Read-Index) AND
    Rx    AAR.Supported-Features.Feature-List.Add    Rx    AAR.Media-Component-
          Description. Media-Sub-Component.Flow-Description.Read-Index)
ELSE IF (RULE IncrementAction-0)
    (Rx              AAR.Media-Component-Description.Media-Sub-Component.Flow-
          Description.Read-Index    Less    Than    Rx    AAR.Media-Component-
          Description.Media-Sub-Component.Flow-Description.Number-Of-Values-At-
          Index Subtract 1)
THEN
    (Rx              AAR.Media-Component-Description.Media-Sub-Component.Flow-
          Description.Read-Index Add 1) AND
    (DSC.Rule-Table TraverseFlowDescriptions >> Recursive Call)
ELSE IF (RULE IncrementAction-1)
    (Rx    AAR.Media-Component-Description.Media-Sub-Component.Read-Index    Less
           Than          Rx           AAR.Media-Component-Description.Media-Sub-
           Component.Number-Of-Values-At-Index Subtract 1)
THEN
    (Rx AAR.Media-Component-Description.Media-Sub-Component.Read-Index Add 1)
           AND
    (Rx              AAR.Media-Component-Description.Media-Sub-Component.Flow-
           Description.Read-Index 0) AND
    (DSC.Rule-Table TraverseFlowDescriptions >> Recursive Call)
ELSE IF (RULE IncrementAction-2)
    (Rx    AAR.Media-Component-Description.Read-Index    Less    Than    Rx    AAR.Media-
           Component-Description.Number-Of-Values-At-Index Subtract 1)
THEN
    (Rx AAR.Media-Component-Description.Read-Index Add 1) AND
    (Rx    AAR.Media-Component-Description.Media-Sub-Component.Read-Index    0)
           AND
    (Rx              AAR.Media-Component-Description.Media-Sub-Component.Flow-
           Description.Read-Index 0) AND
    (DSC.Rule-Table TraverseFlowDescriptions >> Recursive Call)
```

As shown in the above exemplary ruleset, an iteration through AVPs of a particular type may be implemented using the index functionality described herein in conjunction with recursive function calls. As shown, a first rule in the rule set may test the flow description at the currently-set read indices for the Media-Component-Description, Media-Sub-Component, and Flow-Description AVPS against the value "foo." If the condition returns true, then the rule may include instructions to record the three read indices to a Features List object. A second rule may determine whether additional Flow-Description objects remain to be processed within the currently indexed Media-Sub-Component object. If so, then the rule increments the current Flow-Description object and recurses so that the first rule may be applied in view of the updated indices. In a similar manner, the third and fourth rules determine whether additional Media-Sub-Component objects remain in the currently-indexed Media-Component-Description object and whether additional Media-Component-Description objects remain in the message context object. The third and fourth rules may similarly increment the appropriate read index when applicable and recurse. It will be understood index functionality, a DRA may enable a user to intuitively access specific instances of AVPs when a received message includes multiple AVPs of the requested type. Various additional benefits will be apparent in view of the foregoing.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a Diameter Routing Agent (DRA) for processing a Diameter message, the method comprising:
    receiving a Diameter message at the DRA from an origin device;
    establishing a message context object in response to receiving the Diameter message, wherein the message context object includes a first collection of child objects;
    evaluating at least one rule, comprising:
        modifying, based on a first instruction, a first index value associated with the first collection of child objects, wherein:
        the first index value is a read index value;
        accessing, based on a second instruction and from the first collection of child objects, a child object corresponding to the first index value comprises retrieving a value from the child object;
        modifying, based on a third instruction, a write index value associated with the collection of child objects; and
        modifying, based on a fourth instruction, a value of another child object of the first collection of child objects, wherein the other child object corresponds to the write index value; and
    transmitting a message based on the evaluation of the at least one rule.

2. The method of claim 1, wherein evaluating at least one rule further comprises determining, based on a third instruction, a number of elements belonging to the collection of objects.

3. The method of claim 1, wherein:
    the first collection of child objects includes a plurality of second collections of child objects;
    the child object is one of the plurality of second collections of grandchild objects; and
    evaluating at least one rule further comprises:
        modifying, based on a third instruction, a second index value associated with at least one of the second collections of child objects, and
        accessing, based on the second instruction and from the child object, a grandchild object corresponding to the second index value.

4. The method of claim 3, wherein evaluating at least one rule further comprises determining, based on a fourth instruction, a total number of objects belonging to any of the plurality of second collections of child objects.

5. The method of claim 1, wherein
    accessing the child object comprises modifying the Diameter message, and
    transmitting the message comprises transmitting a modified version of the Diameter message.

6. The method of claim 1, wherein the child object corresponds to a multi-valued attribute value pair (AVP) carried by the Diameter message.

7. A Diameter Routing Agent (DRA) for processing a Diameter message, the DRA comprising:
    a rules storage configured to store at least one rule;
    a Diameter stack configured to receive a Diameter message from an origin device;
    a context creator configured to establish a message context object in response to receiving the Diameter message, wherein the message context object includes a first collection of child objects;
    a rule engine configured to evaluate the at least one rule, comprising:
        modifying, based on a first instruction, a first index value associated with the first collection of child objects, wherein: the first index
    value is a read index value;
        accessing by the rule engine, based on a second instruction and from the first collection of child objects, a child object corresponding to the first index value to retrieve a value from the child object;
        modifying by the rule engine, based on a third instruction, a write index value associated with the collection of child objects; and
        modifying by the rule engine, based on a fourth instruction, a value of another child object of the first collection of child objects, wherein the other child object corresponds to the write index value; and
    a message handler configured to transmit, via the Diameter stack, a message based on the evaluation of the at least one rule.

8. The DRA of claim 7, wherein, in evaluating at least one rule, the rule engine is further configured to determine, based on a third instruction, a number of elements belonging to the collection of objects.

9. The DRA of claim 7, wherein:
    the first collection of child objects includes a plurality of second collections of child objects;
    the child object is one of the plurality of second collections of child objects; and
    in evaluating at least one rule, the rule engine is further configured to:
        modify, based on a third instruction, a second index value associated with at least one of the second collections of child objects, and
        access, based on the second instruction and from the child object, a grandchild object corresponding to the second index value.

10. The DRA of claim 9, wherein evaluating at least one rule further comprises determining, based on a fourth instruction, a total number of objects belonging to any of the plurality of second collections of child objects.

11. The DRA of claim 7, wherein:
    in accessing the child object, the rule engine is configured to modify the Diameter message, and
    in transmitting the message, the message handler is configured to transmit a modified version of the Diameter message.

12. The DRA of claim 7, wherein the child object corresponds to a multi-valued attribute value pair (AVP) carried by the Diameter message.

13. A non-transitory machine-readable storage medium encoded with instructions for execution by a Diameter Routing Agent (DRA) for processing a Diameter message, the medium comprising:
  instructions for receiving a Diameter message at the DRA from an origin device; instructions for establishing a message context object in response to receiving the Diameter message, wherein the message context object includes a first collection of child objects;
  instructions for evaluating at least one rule, comprising:
    instructions for modifying, based on a first instruction, a first index value associated with the first collection of child objects, wherein: the first index value is a read index value;
    instructions for accessing, based on a second instruction and from the first collection of child objects, a child object corresponding to the first index value comprise instructions for retrieving a value from the child object; and
    instructions for modifying, based on a third instruction, a write index value associated with the collection of child objects, and
    instructions for modifying, based on a fourth instruction, a value of another child object of the first collection of child objects, wherein the other child object corresponds to the write index value; and
  instructions for transmitting a message based on the evaluation of the at least one rule.

14. The non-transitory machine-readable storage medium of claim 13, wherein the instructions for evaluating at least one rule further comprise instructions for determining, based on a third instruction, a number of elements belonging to the collection of objects.

15. The non-transitory machine-readable storage medium of claim 13, wherein:
  the first collection of child objects includes a plurality of second collections of child objects;
  the child object is one of the plurality of second collections of child objects; and
  instructions for evaluating at least one rule further comprise:
    instructions for modifying, based on a third instruction, a second index value associated with at least one of the second collections of child objects, and
    instructions for accessing, based on the second instruction and from the child object, a grandchild object corresponding to the second index value.

16. The non-transitory machine-readable storage medium of claim 15, wherein the instructions for evaluating at least one rule further comprise instructions for determining, based on a fourth instruction, a total number of objects belonging to any of the plurality of second collections of child objects.

17. The non-transitory machine-readable storage medium of claim 13, wherein
  the instructions for accessing the child object comprise instructions for modifying the Diameter message, and
  the instructions for transmitting the message comprise instructions for transmitting a modified version of the Diameter message.

* * * * *